(12) United States Patent
van Laack

(10) Patent No.: US 10,482,667 B2
(45) Date of Patent: Nov. 19, 2019

(54) DISPLAY UNIT AND METHOD OF CONTROLLING THE DISPLAY UNIT

(71) Applicant: Alexander van Laack, Aachen (DE)

(72) Inventor: Alexander van Laack, Aachen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 15/593,418

(22) Filed: May 12, 2017

(65) Prior Publication Data

US 2017/0330383 A1    Nov. 16, 2017

(30) Foreign Application Priority Data

May 13, 2016   (DE) .................. 10 2016 108 878

(51) Int. Cl.

| | |
|---|---|
| *G06T 19/00* | (2011.01) |
| *B60K 35/00* | (2006.01) |
| *G02B 27/01* | (2006.01) |
| *G06F 3/01* | (2006.01) |
| *G06F 3/0481* | (2013.01) |
| *G06F 3/0488* | (2013.01) |
| *H04N 5/445* | (2011.01) |

(52) U.S. Cl.
CPC ............ *G06T 19/006* (2013.01); *B60K 35/00* (2013.01); *G02B 27/0101* (2013.01); *G06F 3/017* (2013.01); *G06F 3/0488* (2013.01); *G06F 3/04815* (2013.01); *H04N 5/44504* (2013.01); *B60K 2370/146* (2019.05); *B60K 2370/1438* (2019.05); *B60K 2370/1531* (2019.05); *B60K 2370/334* (2019.05); *G02B 2027/014* (2013.01); *G02B 2027/0118* (2013.01); *G02B 2027/0185* (2013.01); *G02B 2027/0194* (2013.01); *G06F 2203/04804* (2013.01)

(58) Field of Classification Search
CPC .... B60K 2350/1028; G02B 2027/0118; G06F 3/0488
See application file for complete search history.

(56) References Cited

U.S. PATENT DOCUMENTS

| | | | |
|---|---|---|---|
| 4,407,564 A | 10/1983 | Ellis | |
| 2005/0084659 A1* | 4/2005 | Dunkel | B32B 17/10 428/209 |
| 2011/0007399 A1* | 1/2011 | Dominici | G02B 27/0101 359/631 |
| 2012/0169861 A1* | 7/2012 | Szczerba | G02B 27/01 348/78 |
| 2012/0249589 A1* | 10/2012 | Gassner | G02B 27/01 345/633 |
| 2016/0004076 A1* | 1/2016 | Matsubara | G02B 27/0101 345/7 |

(Continued)

FOREIGN PATENT DOCUMENTS

| | | |
|---|---|---|
| CN | 202806308 U | 3/2013 |
| WO | 2015041106 A1 | 3/2017 |

*Primary Examiner* — Chun-Nan Lin
(74) *Attorney, Agent, or Firm* — Quinn IP Law

(57) ABSTRACT

The disclosure relates to providing of a display that can provide content through either a virtual image from a heads-up-display or a transparent display physically adhered to the back surface of the heads-up-display. The aspects disclosure herein also relate to providing a detection of an input, and in response to detection, switching the combined display from a first mode to a second mode.

19 Claims, 3 Drawing Sheets

(56) References Cited

U.S. PATENT DOCUMENTS

| | | |
|---|---|---|
| 2016/0159282 A1 | 6/2016 | Kurihara |
| 2017/0276938 A1* | 9/2017 | Nakashima ............ B60K 35/00 |
| 2017/0341593 A1* | 11/2017 | Kuntze ............... B60R 11/0229 |
| 2018/0045958 A1* | 2/2018 | Kuzuhara .............. B60K 35/00 |

* cited by examiner

DISPLAY UNIT AND METHOD OF CONTROLLING THE DISPLAY UNIT

CROSS REFERENCE TO RELATED APPLICATION

This U.S. patent application claims priority to German Patent Application No. 10 2016 108 878.1, filed May 13, 2016, entitled "Display Unit and Method for Representing Information," the entire disclosure of the application being considered part of the disclosure of this application and hereby incorporated by reference.

BACKGROUND

It is known that information can be projected to the visual field of a car driver or of a pilot by a head-up display. A head-up display, also abbreviated as HUD, denotes a display system in which the user can substantially retain the position of his head and of the direction of his view in the original alignment in order to observe the displayed information. Such head-up displays generally comprise an image-generating unit allows information to be represented in the form of an image, a lens module to guide a beam inside the head-up display up to an exit opening (also designated as a mirror lens), and a projection surface for representing the image to be generated. The lens module guides the image onto the projection surface, which is constructed as a reflecting, light-permeable disk and is also designated as a combiner. The vehicle driver sees the reflected information of the image-generating unit and at the same time sees the actual environment behind the disk. Therefore, the attention of a vehicle driver remains, for example when driving a vehicle, on what is happening in front of the vehicle while being able to detect the information projected into the visual field.

The using of a contact-analog representation in vehicles in a 2D perspective or a 3D perspective is also known. Contact-analog information or display elements denote such information or display elements which are inserted in the correct position and correct location in such a manner into the current view of the motor vehicle driver that the vehicle driver has the impression that this information or these display elements are a component of the environment of the vehicle. Therefore, the driver has the impression that a represented arrow indicating a change of the direction of travel or a lane change is arranged directly on the road since the representation of the image of the arrow was superposed on the environment perceived by the vehicle driver. Therefore, this partial covering or superimposing, positionally correct and locationally correct insertion of such information results in a supplementation of the environmental image perceived by a vehicle driver.

Aside from a navigation arrow located directly on the street, an interval beam can also be represented, for example, which should indicate an interval to be maintained from a motor vehicle driving in front. A representation of walls or barriers is also possible which are placed on existing road markings.

In addition, gesture recognition is also known from the prior art in which an automatic recognition of gestures made by a person, in particular a movement of the head, arm, hand or finger of a person takes place. Sensors such as a video camera are required for the contactless recognition of such gestures and which records the gestures of the person. This image information is processed in a calculating unit such as a computer by an appropriate software and makes a recognition of gestures possible in this manner which can be utilized, for example, for a human-machine interaction.

DE 10 2011 121 746 A1 teaches a motor vehicle operating system and a motor vehicle control system for autonomous motor vehicles on an entire windshield display. The described method for navigation of a motor vehicle using a graphic projection display comprises the monitoring of a navigation state graphic which represents a navigation intention and which is displayed on the graphic projection display. The method also comprises the monitoring of a user input which is displayed on a section of the graphic projection display, the initiation of a navigation command defined by the user based on the monitored navigation graphic and of the monitored user input, and the operating of the motor vehicle according to the navigation command defined by the user.

The graphic projection display comprises a substantially transparent windshield as part of an HUD, a touch image screen display, a human-machine interface and a display monitor which is attached inside the motor vehicle.

US 2012/0249589 A1 teaches a method for the outputting of graphic driving suggestions in which in order to support the vehicle driver of an automobile when carrying out the driving maneuver the graphic driving suggestions are outputted by a head-up display provided in the automobile.

The method comprises the following steps, the outputting of a first graphic driving suggestion in the form of a driving stretch change which points out to the vehicle driver the direction of a driving stretch travel at the beginning of the maneuver to a theoretical driving stretch, the outputting of a second graphic driving suggestion in the form of a contact-analog driving stretch marking which emphasizes the theoretical driving stretch graphically in contrast to other driving stretches, the outputting of a third graphic driving suggestion in the form of a contact-analog maneuvering impulse which comprises a driving path starting from the theoretical driving stretch and corresponding to the driving maneuver, and the outputting of a fourth graphic driving suggestion in the form of a symbolic representation of a maneuver suggested which symbolically indicates the started driving maneuver after the entrance of the vehicle into the driving path.

EP 2 894 509 A1 teaches a view field display for a vehicle for representing image information in two independent images for an observer. One view field display is disclosed in it which comprises a device for making available a first image of the two independent images in a first optical axis and makes available a second image of the two independent images in a second optical axis which is different at least in sections from the first optical axis, and comprises a device for deflecting a projection of the first image and/or a projection of the second image.

The deflection device is constructed as an at least partially transparent projection surface which is arranged in the first optical axis of the first image and/or in the second optical axis of the second image, wherein the projection of the first image is guided along the first optical axis in the direction of the observer and wherein the projection of the second image is guided along the second optical axis in the direction of the observer.

The view field display can comprise a projection surface here which is constructed for deflecting the projection and for generating a contact-analog display.

EP 2 018 992 A1 is an automobile cockpit with a plurality of display units for the representing of information. The display units are arranged at different positions in the interior of the automobile. The type and the content of the information represented at a display unit can be controlled by a control arrangement. An association of a limb of a user with a first display unit as well as a gesture-dependent change of the association to another display unit can be detected in a contactless manner by a receiving means, the information about the change of the association can be forwarded to the control arrangement, and the other display unit for representing the information of the first display unit can be controlled by the control arrangement in accordance with the change of the association.

It is possible by an appropriate hand movement which is recognized as a gesture to shift the representation of a signal or of a piece of information from a first representation site such as a first display to a second or third representation site inside a motor vehicle. In this manner, for example, a representation can be shifted from a display in a central console of the vehicle to a head-up display.

A disadvantage of the known prior art is the fact that a projection surface of a HUD or a windshield used for the representation, that is, the projection surface for the representation of the image to be generated is usually located outside of the reach of the vehicle driver or at least cannot be reached in a comfortable and reliable manner. Another disadvantage resides in the separation between a projection surface and an input means suitable for an interaction.

Furthermore, a user input by touching the projection surface is also rendered difficult in that a projected object such an in input key optically appears behind the projection surface and can therefore not be reached by a finger of the user.

Since the known head-up display units do not comprise touch-sensitive means suitable for the operation, these head-up display units are only used as display instruments for representing information for the vehicle driver. A use in the form of a central control display in a motor vehicle is not realized.

SUMMARY

The disclosure relates to a display for representing information, which includes at least one head-up display with an image generating unit and a projection surface for generating a virtual image.

The disclosure also relates to a method for representing information on a display unit, wherein a virtual image is generated in a first operating mode of the display unit by a head-up display unit.

The information which can be represented includes the displaying of operating states such as indications of the speed, engine speed, safe load, equipment and information from a navigation system, radar system or target detection system. In addition, for example in motor vehicles, information about the current stretch limitations such as no passing and speed limits or the current adaptive cruise control, abbreviated as ACC, and others can be displayed.

Disclosed herein is a display unit for representing information and a method for representing information on a display unit, wherein a two-dimensional and also a three-dimensional representation of content as well as also an interaction by inputs of a user are made possible. In addition, the arrangement should be able to be produced in a simple and economical manner.

The aspects disclosed herein provide a display unit in the form of a head-up display not only as a display instrument for representing information for a vehicle driver but also as a central control display, for example in a central console of an automobile.

The aspects disclosed herein provide a combination of a contactless display, also designated as a touchscreen display, with a head-up display, which makes possible graphic representations as well as interactions with the vehicle driver.

To this end a customary head-up display unit for representing graphic information or objects is used with a combiner, which is also designated as a projection surface. The head-up display unit can generate two-dimensional or three-dimensional representations by a central control unit not described in detail and project them, for example, into the viewing area of a vehicle driver. Therefore, the vehicle driver sees information from the vehicle environment as well as the image information generated by the head-up display unit.

The invention is also provided with a using of the display unit of the invention in the area of the central console of an automobile. In this embodiment the vehicle driver sees the representation of graphic information or objects by the projection surface in the form of a holographic representation without information from the vehicle environment.

In order to realize the display unit according to the invention, it is provided that a transparent display, for example, consisting of organic light-emitting diodes, abbreviated as an OLED display, is arranged on the back side of the projection surface. A connection between the projection surface and the transparent display can then take place, for example by adhesion or bonding.

In order to provide the vehicle driver an ability to interact with the display unit, a technique for recognizing gestures of the vehicle driver is arranged inside the vehicle. Alternatively, inputs by the vehicle driver can also be detected by a capacitively acting input device or one based on infrared technology. Such input technology can extend, for example, parallel to the surface of the projection surface and can detect an approach to the projection surface or display surface or can detect a touching of the display surface by the vehicle driver. Another device for recognizing gestures are fly-time systems, also designated as TOF systems for "time of flight", which can make gestures recognizable by a photomixing detector, also designated as a PMD sensor for "photonic mixing device", by a measuring of the run time of the emitted light.

The detected gestures or touches are evaluated in a central control unit and therefore, for example, an interaction of the vehicle driver such as activating a virtual key represented only in the display unit is recognized.

After the recognition of the key activation a corresponding reaction such as a turning on or a turning off of a function or of a structural group of the vehicle is realized. Furthermore, even functions such as loudness, brightness, zoom and many others can be regulated. This enumeration does not represent any limitation and can be changed and expanded as desired by a person skilled in the art in all areas in which a display is used with which an interaction can take place.

Since the image reflected by the projection surface seems to float for the vehicle driver or user in the space behind the projection surface, which is also designated as a virtual image, the user has the impression that a type of hologram is concerned.

Since it is not possible to touch with a finger a virtual object generated by the projection surface, a transparent display connected to the upper layer of the projection surface is provided on which objects or symbols can be indicated which are provided for an interaction with the vehicle driver.

The transparent display, which can be constructed, for example, as an OLED display, makes a display available which seems to be two-dimensional and can be readily reached and touched, for example, by a finger of the vehicle driver.

It is also provided here that a change can be made between a holographic, three-dimensional representation, abbreviated as a 3D representation or 3D and a two-dimensional representation, abbreviated as a 2D representation or 2D. Therefore, for example a change from a 3D representation to a 2D representation can take place if it is recognized by appropriate sensors that the finger of the vehicle driver approaches the projection surface or the display surface or touches the projection surface or the display surface.

For example, an object previously shown three-dimensionally can be converted into an object shown two-dimensionally by a suitably designed graphic transfer and can therefore be represented in such a manner that it can be reached by the vehicle driver. The impression can be imparted here that the user during the approach to the projection surface or to the display surface as a graphical user surface, abbreviated as GUI for "Graphical User Interface" pulls the object from the virtual image onto the projection surface or the display surface.

If the finger of the vehicle driver is removed again after an input or interaction from the projection surface or the display surface, an inversely shaped graphic transfer from a 2D object to a 3D object can be brought about.

BRIEF DESCRIPTION OF THE DRAWINGS

Other details, features and advantages of embodiment of the invention result from the following description of exemplary embodiments with reference made to the attached drawings. In the drawings.

DETAILED DESCRIPTION

Figure 1:
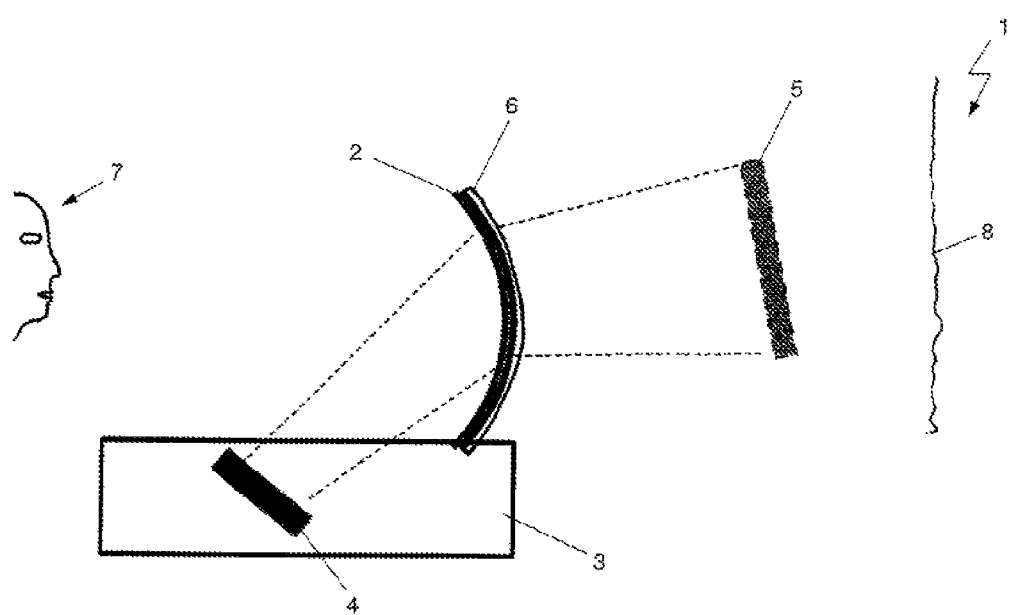
FIG. 1 shows a basic representation of an arrangement according to the invention for representing information on a display unit.

FIG. 1 shows the display unit 1, which includes a projection surface 2 of a head-up display unit 3 with an image generating unit 4. The representation of FIG. 1 includes only components of the units which area essential and necessary for their explanation. The image generation unit 4 arranged in the head-up display unit 3 projects an image to be represented onto the projection surface 2, the combiner, and generates a virtual image 5. The virtual image 5 appears for a user 7 at an appropriate distance behind the projection surface 2. In addition to this virtual image 5, the user 7 can also see the background 8 of the virtual image 5.

In the arrangement of the head-up display unit 3 in a motor vehicle, the user 7 is able to recognize the real vehicle environment in which the user 7 is moving with the vehicle as background 8 in the area of the front windshield. In the case that the head-up display unit 3 is being used in a central console of a motor vehicle, the background 8 can be fixed as desired. In addition to mono-color or multi-colored backgrounds 8 even an image or a video can be used as background 8. Even the insertion of a scene from the vehicle environment recorded by a camera located in or on the motor vehicle is possible, for example, a view behind the vehicle before or during a reverse movement of the motor vehicle can be inserted.

In order to realize the idea according to the aspects disclosed herein of making available a 2D view as well as a 3D view in the display for a user 7 and interactions with the display unit 1, a transparent display 6 is arranged, for example, behind the projection surface 2. The transparent display 6, which can be constructed, for example, as an OLED display, is advantageously permanently connected to the surface of the projection surface 2. Such a connection can be achieved by a bonding method or an adhesive method.

In the case that the display 6 is transparent, the user 7 sees, for example, the virtual image 5 and the vehicle environment or the virtual image 5 and a background 8 which is appropriately inserted or is firmly present in the display unit 1.

Figure 2:
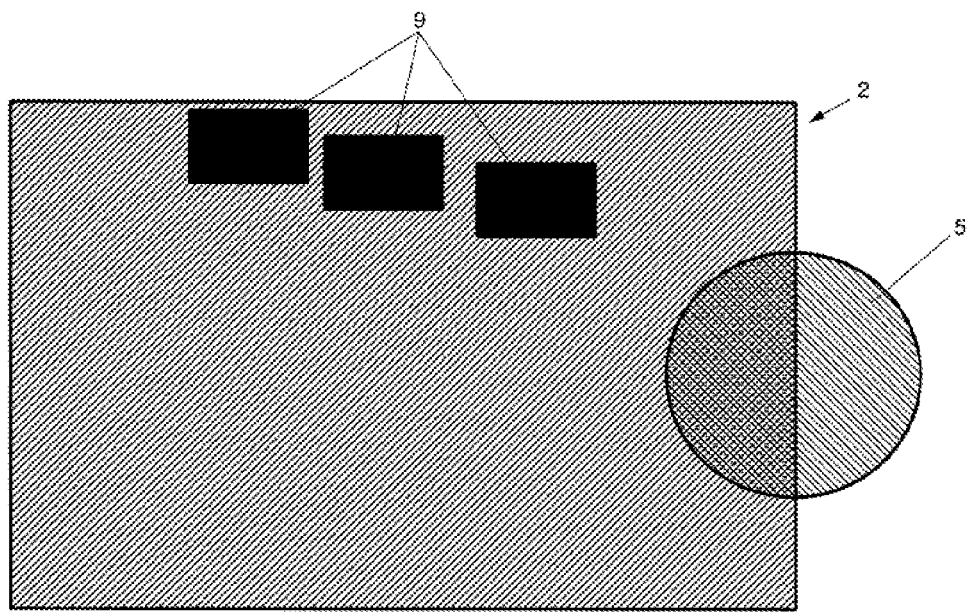
FIG. 2 shows an exemplary representation of 2D objects and 3D objects with the display unit according to FIG. 1.

In the case that the display 6 is controlled by an appropriate control unit, which is not shown, in such a manner that one or more contents or objects 9 such as graphics, written signs, symbols and others according to FIG. 2 are displayed, the user 7 sees the objects 9 in two dimensions on the surface of the display unit 1. Therefore, for example, him selection keys or functional keys can be made available by which the user 7 can make a selection. Vehicle functions, for example, the air conditioning, sound system, automatic transmission functions and other adjustment or usages such as a navigation program can be controlled by such a selection.

FIG. 2 shows a graphic representation generated with an arrangement according to FIG. 1. In a first operating mode of the display unit 1 in which the transparent display 6 appears transparently, a virtual image 5 is generated by the head-up display unit 3 which image appears to the user 7 behind the surface of the display unit 1 in a three-dimensional representation. In the representation of FIG. 2 the virtual image 5 is shown offset laterally to the right. The offset should correspond to a spatial impression of a user 7 looking from the left onto the display unit 1. The user 7 perceives from his position as the vehicle driver the image in the form of a holographic representation.

In the case that the user 7 comes in the vicinity of the surface of the display unit 1 with his hand or with a finger, the head-up display unit 3 is turned off or controlled in such a manner that the virtual image 5 is no longer generated and the transparent display 6 is activated. In order to recognize an approach to the surface of the display unit 1, various methods for recognizing gestures or, for example, methods which function capacitively or with infrared can be used.

If an approach to the surface of the display unit 1 is detected, selection possibilities or switches for the corresponding operating function in the form of one or more objects 9 are represented on the display 6 in a second operating mode by the transparent display 6. FIG. 2 shows by way of example three rectangular objects 9, wherein the qualities of the objects 9 such as shape, color, the location of the representation, labels and others can be adapted as desired. Such an object 9 can also be, for example, a written character, a symbol, a geometrical shape, a graphic, an image and other things.

For example, a selection of available radio stations, operating functions or travel destinations can be made available with the above. The user 7 can make a selection interactively by touching the surface of the display unit 1 at the position of an appropriate object 9. The display unit 1 recognizes on a capacitive or infrared basis the undertaken selection with the aid of the central control unit and initiates a corresponding reaction in accordance with the undertaken selection of the user 7.

The transfer from the first to the second operating mode and vice versa is smoothly completed here, which means that the 3D representation in the first operating mode, for example, is changed in such a manner that the impression is created that a represented 3D object is drawn out of the distance behind the projection surface 2 onto the surface of the transparent display 6 and merges into a 2D object. The 2D object is then available for an interaction with the vehicle driver or user 7.

When the user 7 has made his selection or has removed his hand or his finger from the surface of the display unit 1 again, after the passage of a given time a transfer from the second operating mode to the first operating mode is completed. In order to recognize the removal of the finger from the surface of the display unit 1, a gesture recognition is used or a detection by a capacitive or infrared sensor is again carried out.

Alternatively, the transfer from the second to the first operating mode can also be started by a corresponding input of the user 7.

Another embodiment provides that the transfer from one operating mode to the other operating mode is not completely carried out. In this case, for example, a part of the 3D representation remains retained while a 2D representation is displayed for the selection and/or for information by the transparent display 6. In this case it is provided that the visibility of the 3D representation is reduced in order to ensure a good ability to recognize the 2D representation. The visibility of the 3D representation is reduced, for example, to a value of 25%, 20%, 15%, 10%, or 5% and therefore the 3D representation is rendered transparent.

Figure 3:
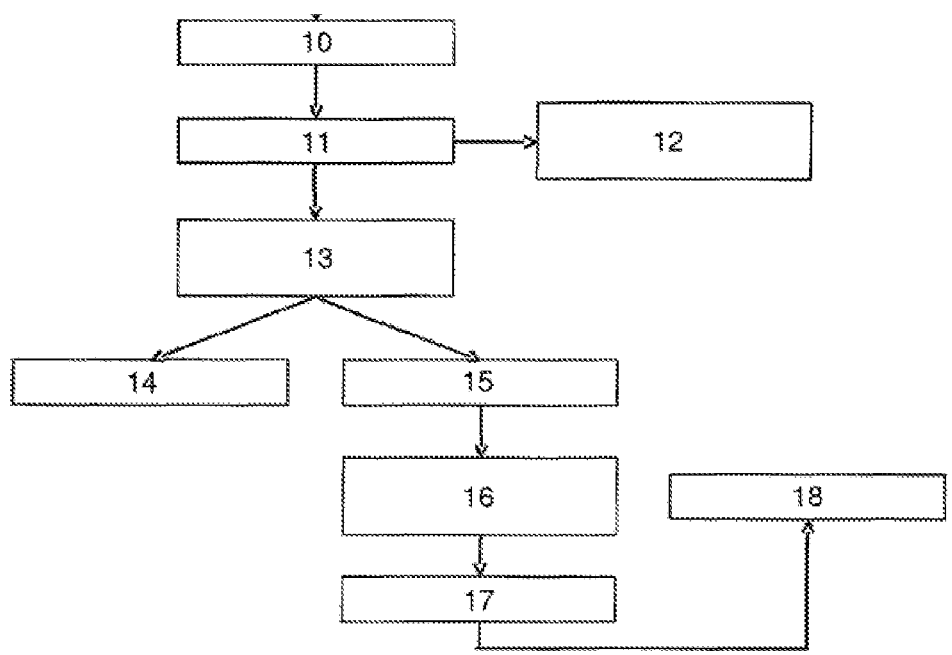
FIG. 3 shows a method for controlling the display unit according to the invention.

FIG. 3 shows an exemplary course of the method for controlling the display unit 1 of the invention. In step 10 the display unit 1 with the head-up display unit 3 is started up. In this method step there is the possibility of generating a 3D representation.

In step 11 a check is made by a method for gesture recognition or by a sensor operating with infrared or capacitively whether a hand of the user 7 is approaching the surface of the display unit 1.

In the case that no approach is detected in step 11, in step 12 a 3D representation of a virtual image 5 is generated in accordance with the first operating mode in step 12.

If a hand is detected in step 11 approaching the surface of the display unit 1, then a check is made in step 13 whether a set distance to the surface of the display unit 1 was dropped below during the approach. If a given distance to the surface of the display unit 1 is dropped below, in step 14 an at least partial cutting off of the head-up display unit 3 will take place. The head-up display unit 3 can be completely cut off and therefore does not generate any more virtual image 5. Alternatively, the head-up display unit 3 is controlled in such a manner that the virtual image 5 is reduced in its intensity and therefore can only be perceived to a low degree. The first operating mode is terminated. A change of position of the represented 3D object, that is, of the virtual image 5, for example, up to an object 9 represented in 2D can also take place with the reduction.

Along with the influencing of the head-up display unit 3 in step 14, at the same time the transparent display 6 is started in a second operating mode in step 15. Objects 9 are displayed on this transparent display 6 which are suitable for an interaction with the user 7. In step 15, for example, selection possibilities in the area of air conditioning, the navigation unit, of a sound system or of a radio receiver and more can be displayed.

Subsequently, it is possible for the user 7 in step 16 to select, change or turn on or turn off functions of the above-described systems. In order to detect the touching of the surface of the display unit 1, the surface is provided with any means known from the prior art for detecting a touching of the surface which can operate, for example, capacitively.

If the hand of the user 7 is removed from the surface of the display unit 1, this is recognized in step 17 by one of the means already described for the approach. Consequently, the transparent display 6 is turned off in step 18 and then appears completely transparent again. The second operating mode is terminated and the transfer to the first operating mode takes place in which the head-up display unit 3 is started up again and a virtual image 5 is generated.

After leaving the step 17 the course is continued in step 10, wherein the described course starts from the beginning.

If the display unit 1 according to the invention with the unit consisting of a projection surface 2 and the transparent display 6 is arranged so that it can be readily reached by the user 7, virtual images 5 can be inserted into the environment located in front of the vehicle, as is known from the prior art, and an interaction while observing certain safety regulations is possible. Also, contact-analog representations in the environment of the vehicle are then possible.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A display, comprising:
at least one head-up display unit, the at least one head-up display unit having an image generating unit for projecting an image;
a combiner for generating a virtual image from the image projected by the image generating unit, the combiner including a first surface facing the image generating unit and a second surface facing away from the image generating unit, the first surface providing a projection surface for displaying the virtual image;
a transparent display arranged on the second surface of the combiner, wherein the transparent display is adjustable between a first operating mode whereby the transparent display is transparent and projects the virtual image from the head-up display unit and a second operating mode whereby the transparent display selectively displays information on the transparent display;
a central control unit in communication with the head-up display unit; and
a device in communication with the central control unit for detecting at least one input, wherein the at least one input is selected from the group consisting of a gesture, an input at a predetermined distance away from a surface of the transparent display and an input at the surface of the transparent display,
wherein, in response to the device recognizing the at least one input, the central control unit adjusts one or more operations of the transparent display.

2. The display according to claim 1, wherein the transparent display is arranged by bonding or adhesion on the second surface of the combiner.

3. The display unit according to claim 1, wherein the transparent display is defined as an organic light emitting diode (OLED) display.

4. The display according to claim 3, wherein the OLED display of the transparent display generates a two-dimensional representation that can be touched by an input of a vehicle driver.

5. The display according to claim 1, wherein the device for detecting the at least one input may be one or more devices selected from the group consisting of a capacitively acting input device, an infrared technology input device and a photomixing detector.

6. The display according to claim 1, wherein a holographic, three-dimensional representation of the virtual image is changed to a two-dimensional representation when the device for detecting at least one input recognizes the at least one input.

7. The display according to claim 1, wherein the transparent display is adjustable between the first operating mode and the second operating mode when the device for detecting at least one input recognizes the at least one input.

8. The display according to claim 7, wherein an intensity of virtual image projected by the image generating unit is reduced by a predetermined non-zero amount when the device for detecting at least one input recognizes the at least one input.

9. The display according to claim 7, wherein the image generating unit is adjusted from an on state to an off state to terminate generation of the virtual image when the device for detecting at least one input recognizes the at least one input.

10. A method for controlling a display, comprising:
providing a head-up display unit with a transparent display, wherein the head-up display unit and the transparent display are in an overlapping relationship;
projecting an image with the head-up display unit having an image generating unit;
generating a virtual image from the image projected by the image generating unit with a combiner, wherein the combiner includes a first surface facing the image generating unit providing a projection surface for displaying the virtual image and a second surface facing away from the image generating unit;
providing the transparent display arranged on the second surface of the combiner;
detecting at least one input with a device in communication with one or more of the head-up display unit and the transparent display, wherein the device detects the at least one input selected from the group consisting of a gesture, an input at a predetermined distance away from a surface of the display and an input at the surface of the display;
adjusting one or more of the head-up display unit and the transparent display between a first operating mode and a second operating mode;
controlling, in the first operating mode, the transparent display to project a virtual image from the head-up display unit; and
controlling, in the second operating mode, the transparent display to selectively display, two-dimensional content, wherein the two-dimensional content provides a same information as the virtual image, wherein a holographic, three-dimensional representation of the virtual image is changed to the two-dimensional content when the device for detecting the at least one input recognizes the at least one input.

11. The method according to claim 10, further comprising:
detecting the at least one input at a surface of the transparent display, or at a predetermined distance away from the surface of the transparent display, and
in response to detecting the at least one input, switching the transparent display from the first operating mode to the second operating mode.

12. The method according to claim 11, wherein the controlling of one or more of the head-up display unit and the transparent display in the second operating mode, is defined by reducing an intensity of the virtual image generated by the image generating unit of the head-up display unit by a predetermined non-zero amount.

13. The method according to claim 11, wherein the controlling of one or more of the head-up display unit and the transparent display in the second operating mode, is defined by turning off the virtual image generated by the image generating unit of the head-up display unit entirely.

14. The method according to claim 10, further comprising:
detecting the at least one input at the surface of the transparent display, or at a predetermined distance away from the surface of the transparent display, and
in response to detecting the at least one input, switching the display from the second operating mode to the first operating mode.

15. A display for a vehicle, comprising:
a head-up display unit, the head-up display unit having an image generating unit for projecting an image;
a combiner for generating a virtual image from the image projected by the image generating unit, the combiner including a first surface facing the image generating unit and a second surface facing away from the image generating unit, the first surface providing a projection surface for displaying the virtual image; and
a transparent display arranged on the second surface of the combiner, wherein the transparent display is adjustable between a first operating mode whereby the transparent display is transparent and projects the virtual image from the head-up display unit and a second operating mode whereby the transparent display selectively displays information on the transparent display; and
a device for detecting at least one input in communication with one or more of the head-up display unit and the transparent display, wherein the device detects at least one input selected from the group consisting of a gesture, an input at a predetermined distance away from a surface of the transparent display and an input at the surface of the transparent display.

16. The display for the vehicle according to claim 15, further comprising a central control unit in communication with the head-up display unit and the device for detecting at least one input, wherein, in response to the device recognizing the at least one input, the central control unit adjusts one or more operations of the transparent display.

17. The display for the vehicle according to claim 15, wherein the device for detecting the at least one input may be one or more devices selected from the group consisting of a capacitively acting input device, an infrared technology input device and a photomixing detector.

18. The display for the vehicle according to claim 15, wherein a holographic, three-dimensional representation of the virtual image is changed to a two-dimensional representation when the device for detecting at least one input recognizes the at least one input.

19. The display for the vehicle according to claim 15, wherein the transparent display is adjustable between the first operating mode and the second operating mode when the device for detecting at least one input recognizes the at least one input.

\* \* \* \* \*